US011439264B2

(12) United States Patent
Little et al.

(10) Patent No.: US 11,439,264 B2
(45) Date of Patent: Sep. 13, 2022

(54) APPARATUSES AND METHODS FOR CUTTING, SPREADING, AND/OR DISPENSING FOOD PRODUCT

(71) Applicant: Prota Labs, LLC, Chicago, IL (US)

(72) Inventors: William C. Little, Chicago, IL (US); Kyle A. Buzzard, Lombard, IL (US)

(73) Assignee: Prota Labs, LLC, Chicago, IL (US)

( * ) Notice: Subject to any disclaimer, the term of this patent is extended or adjusted under 35 U.S.C. 154(b) by 82 days.

(21) Appl. No.: 16/384,771

(22) Filed: Apr. 15, 2019

(65) Prior Publication Data

US 2019/0313830 A1 Oct. 17, 2019

Related U.S. Application Data

(60) Provisional application No. 62/659,087, filed on Apr. 17, 2018.

(51) Int. Cl.
*A47J 9/00* (2006.01)
*B26D 1/00* (2006.01)
(Continued)

(52) U.S. Cl.
CPC .............. *A47J 9/003* (2013.01); *A47J 9/001* (2013.01); *B26D 1/0006* (2013.01);
(Continued)

(58) Field of Classification Search
CPC ....... A47J 9/003; A47J 9/006; B26D 2210/02; B26D 1/547; B26D 1/553; B26D 3/18–225; B26D 3/11
(Continued)

(56) References Cited

U.S. PATENT DOCUMENTS 656,745 A * 8/1900 Mivelaz .............. B29C 48/0022
425/308
1,005,128 A * 10/1911 Blain ..................... B26D 1/547
83/437.2
(Continued)

FOREIGN PATENT DOCUMENTS

DE  202006010907 U1  11/2007
DE  202010013511 U1  1/2011

OTHER PUBLICATIONS

Butter Boss 2 (Quirky products); http://www.trendhunter.com/trends/butter-boss.
(Continued)

*Primary Examiner* — Kenneth E Peterson
(74) *Attorney, Agent, or Firm* — Clements Bernard Baratta; Christopher L. Bernard

(57) ABSTRACT

A housing has a first end and a second end, an inner surface of the housing defining a channel that is configured to slidably receive therein a food product. A food product motivating mechanism is configured to engage a food product, the food product motivating mechanism being slidably receivable in the first end of the housing, the food product motivating mechanism and the housing being configured to cooperatively slidably urge a food product from the first end of the housing toward the second end of the housing. A rotating cutting mechanism is removably attachable to an outer surface of the second end of the housing, the rotating cutting mechanism being configured to rotate about the second end of the housing, the rotating cutting mechanism being further configured to cuttingly engage a food product.

12 Claims, 3 Drawing Sheets

(51) Int. Cl.
*B26D 7/06* (2006.01)
*B26D 7/22* (2006.01)
*B26D 1/547* (2006.01)
*B26D 1/12* (2006.01)

(52) U.S. Cl.
CPC ......... *B26D 7/0608* (2013.01); *B26D 7/0683* (2013.01); *B26D 7/22* (2013.01); *A47J 2009/008* (2013.01); *B26D 1/12* (2013.01); *B26D 1/547* (2013.01); *B26D 2001/008* (2013.01); *B26D 2210/02* (2013.01)

(58) Field of Classification Search
USPC ........................................................ 83/651.1
See application file for complete search history.

(56) References Cited

U.S. PATENT DOCUMENTS

| | | | | |
|---|---|---|---|---|
| 1,623,288 | A * | 4/1927 | Topinka | B26D 1/547 83/136 |
| 1,679,004 | A * | 7/1928 | Pinkel | A47G 19/26 83/395 |
| 1,687,809 | A * | 10/1928 | Trouvalis | A01J 21/00 83/226 |
| 1,826,519 | A * | 10/1931 | Lowry | A01J 21/02 83/435.16 |
| 1,846,423 | A * | 2/1932 | Harrington | A23G 9/287 83/420 |
| 2,580,864 | A * | 1/1952 | Upright | A01J 21/00 83/147 |
| 2,642,899 | A * | 6/1953 | Simmons | A23G 3/0268 138/157 |
| 2,737,721 | A * | 3/1956 | Hart | A01J 23/00 83/437.5 |
| 2,814,113 | A * | 11/1957 | Morlacchi | A01J 23/00 83/437.2 |
| 2,884,877 | A | 5/1959 | Nalbone et al. | |
| 3,750,913 | A | 8/1973 | Wild | |
| 3,920,156 | A * | 11/1975 | Hicks | B65D 83/0005 222/80 |
| 4,387,111 | A * | 6/1983 | Mullender | A23L 19/05 426/615 |
| 4,513,501 | A * | 4/1985 | Lee | A01J 19/00 30/115 |
| 4,644,838 | A * | 2/1987 | Samson | B26D 7/06 83/162 |
| 4,697,488 | A * | 10/1987 | Cole | B26D 1/547 30/116 |
| 4,960,024 | A * | 10/1990 | Holcomb | A47G 19/26 222/386 |
| D315,083 | S * | 3/1991 | Anderson | D7/670 |
| 5,621,972 | A * | 4/1997 | Sala | A01J 23/00 30/116 |
| 5,955,114 | A | 9/1999 | Llanos | |
| 6,082,596 | A | 7/2000 | Koch et al. | |
| D443,800 | S * | 6/2001 | Weterrings | D7/670 |
| 6,748,854 | B2 * | 6/2004 | Barnard | A23N 7/08 99/545 |
| 7,037,094 | B1 | 5/2006 | Lee | |
| 7,566,015 | B2 * | 7/2009 | Schoppel | B26D 1/553 241/84 |
| 7,832,106 | B2 * | 11/2010 | Drake | B26D 3/169 30/282 |
| 8,136,443 | B2 * | 3/2012 | Lee | B26D 3/11 99/590 |
| 9,084,499 | B2 | 7/2015 | Papavero et al. | |
| 9,693,648 | B2 * | 7/2017 | Schwartz | B26D 3/26 |
| 10,080,451 | B2 * | 9/2018 | Chen | B05C 17/012 |
| 10,751,897 | B2 * | 8/2020 | Fung | B26D 7/0641 |
| 10,765,262 | B2 * | 9/2020 | Cheung | A47J 43/07 |
| 10,906,199 | B2 * | 2/2021 | Bagley | B26D 3/185 |
| 2001/0048004 | A1 | 12/2001 | Malik et al. | |
| 2014/0175132 | A1 | 6/2014 | John et al. | |

OTHER PUBLICATIONS

Butter Boss1 (Goose Products); https://www.goosegadgets.com/butter-dish.
Buttermate (KitchenArt32000); https://www.kitchenart.com/ProductDetails.asp?ProductCode=32000.
One Click Butter Cutter; http://www.buttercutter.com/.

* cited by examiner

APPARATUSES AND METHODS FOR CUTTING, SPREADING, AND/OR DISPENSING FOOD PRODUCT

FIELD

The present disclosure relates to cutting, spreading, and/or dispensing food products.

BACKGROUND

The statements in this section merely provide background information related to the present disclosure and may not constitute prior art.

Spreading food products, such as butter, margarine, spreads, and the like onto food and/or into pans can be a messy and clumsy process that typically entails a cutting surface and utensils that then have to be cleaned. Alternatively, a user can hold a stick of food product, attend to a loose wrapper, and then use a utensil to cut off a dirty end of the food product. Measuring and cutting such food products is inconvenient and typically entails dirtying a knife or utensil by cutting through the wrapper (which may have measurements on it), and then peeling and discarding the cut wrapper.

Currently-known devices may be hard to load, difficult to clean, and/or do not have an integrated cutter. For example, some currently known devices use screw drives to advance the food product, can be time consuming to load, and can be hard to clean. Some currently known screw drive systems can have a tendency to stop working if the food product gets soft. Some currently known devices with a screw drive system also have no cutter. One currently known device that has a cutter is very large, is hard to clean, does not permit a user to control the amount of food product that is desired to be cut, and does not allow a user to spread food product directly from the device.

SUMMARY

Disclosed embodiments include apparatuses and methods for cutting, spreading, and/or dispensing food product and methods of fabricating an apparatus for cutting, spreading, and/or dispensing food product.

In an illustrative embodiment, an apparatus includes a housing having a first end and a second end, an inner surface of the housing defining a channel that is configured to slidably receive therein a food product. A food product motivating mechanism is configured to engage a food product, the food product motivating mechanism being slidably receivable in the first end of the housing, the food product motivating mechanism and the housing being configured to cooperatively slidably urge a food product from the first end of the housing toward the second end of the housing. A rotating cutting mechanism is removably attachable to an outer surface of the second end of the housing, the rotating cutting mechanism being configured to rotate about the second end of the housing, the rotating cutting mechanism being further configured to cuttingly engage a food product.

In another illustrative embodiment, an apparatus includes a housing having a first end and a second end, an inner surface of the housing defining a channel that is configured to slidably receive therein a food product, a shape of the outer surface of the housing being substantially circular and a shape of the inner surface of the housing being substantially square, the housing defining therein a longitudinal slot from the first end toward the second end. A food product motivating mechanism is configured to engage a food product, the food product motivating mechanism being slidably receivable in the first end of the housing, the food product motivating mechanism and the slot being configured to cooperatively slidably urge a food product from the first end of the housing toward the second end of the housing. A rotating cutting mechanism is removably attachable to an outer surface of the second end of the housing, the rotating cutting mechanism being configured to rotate about the second end of the housing, the rotating cutting mechanism being further configured to cuttingly engage a food product.

In another illustrative embodiment, an apparatus includes a housing having a first end and a second end, an inner surface of the housing defining a channel that is configured to slidably receive therein a food product. A food product motivating mechanism is configured to engage a food product, the food product motivating mechanism being slidably receivable in the first end of the housing, the food product motivating mechanism and the housing being configured to cooperatively slidably urge a food product from the first end of the housing toward the second end of the housing. A rotating cutting mechanism is removably attachable to an outer surface of the second end of the housing, the rotating cutting mechanism being configured to rotate about the second end of the housing, the rotating cutting mechanism being further configured to cuttingly engage a food product, the rotating cutting mechanism including a cutting member chosen from a wire and a blade.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

DETAILED DESCRIPTION

The following description is merely illustrative in nature and is not intended to limit the present disclosure, application, or uses.

Figure 1:
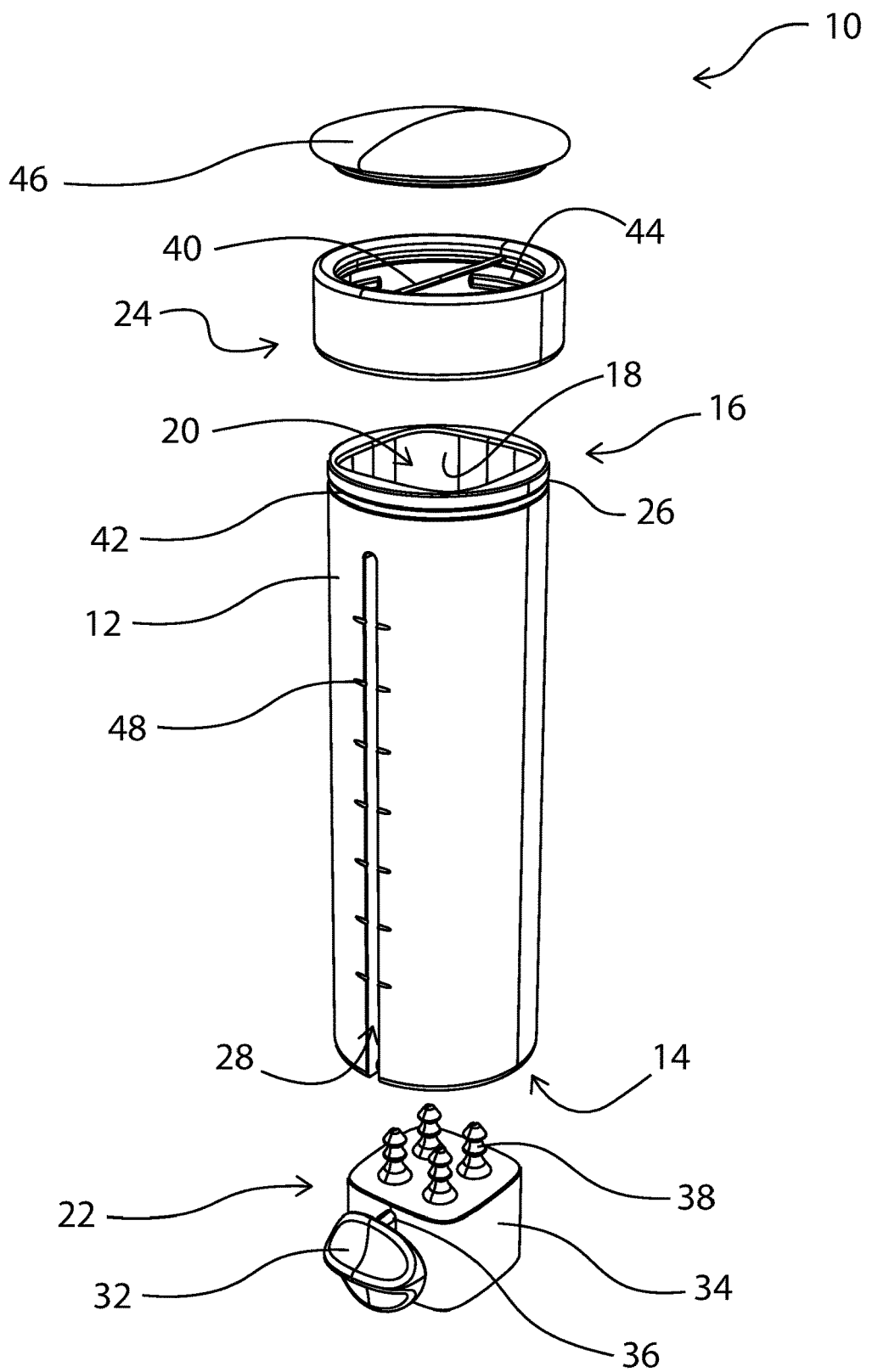
FIG. 1 is an exploded perspective view of an illustrative apparatus for cutting, spreading, and/or dispensing food product.
Figure 3A:
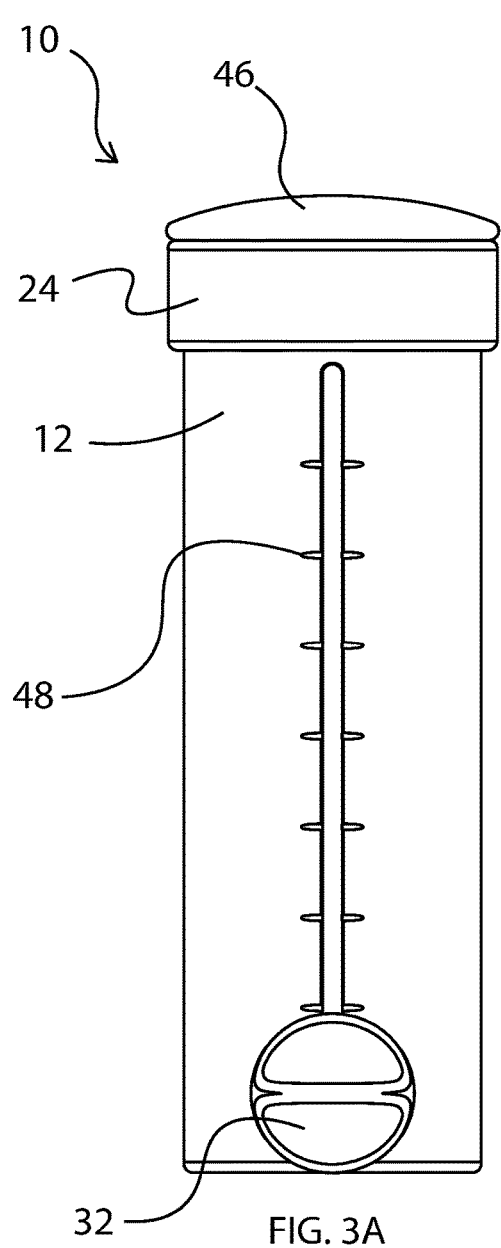
FIG. 3A is a front plan view of an assembled apparatus of FIG. 1.
Figure 3B:
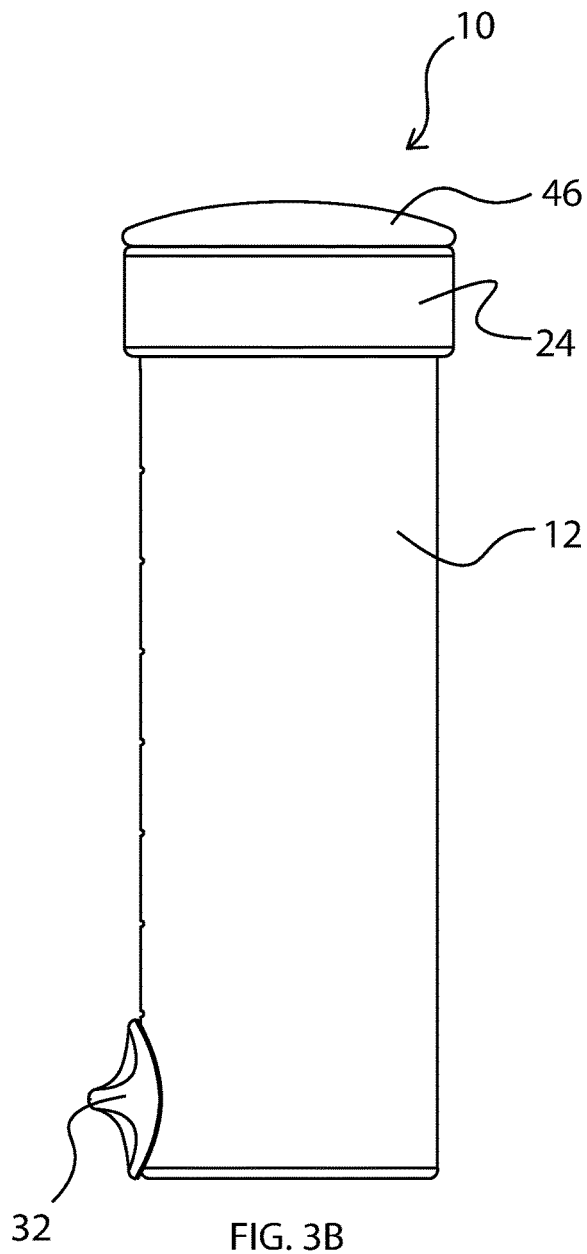
FIG. 3B is a side plan view of an assembled apparatus of FIG. 1.

Given by way of overview and referring to FIGS. 1, 3A, and 3B, in various embodiments an apparatus 10 includes a housing 12 having a first end 14 and a second end 16, an inner surface 18 of the housing defining a channel 20 that is configured to slidably receive therein a food product (not shown). A food product motivating mechanism 22 is configured to engage a food product, the food product motivating mechanism 22 being slidably receivable in the first end 14 of the housing 12, the food product motivating mechanism 22 and the housing 12 being configured to cooperatively slidably urge a food product from the first end 14 of the housing 12 toward the second end 16 of the housing 12. A rotating cutting mechanism 24 is removably attachable to an outer surface 26 of the second end 16 of the housing 22, the rotating cutting mechanism 24 being configured to rotate about the second end 16 of the housing 12, the rotating cutting mechanism 24 being further configured to cuttingly engage a food product.

Still by way of overview, in various embodiments food product (such as without limitation butter, margarine, spreads, and the like) is held inside the housing 12 and is secured to the food product motivating mechanism 22. The food product motivating mechanism 22 and the rotating cutting mechanism 24 cooperate to allow a user to measure, dispense, spread, and/or cut food product without using any other cutting surfaces or utensils or interacting directly with a stick of food product. In addition, various components may be removably attachable to the housing 12, thereby helping contribute to ease of assembly, disassembly, and cleanup after use.

Now that a non-limiting overview has been provided, details of various disclosed embodiments will be explained with non-limiting examples that are provided by way of illustration only and not of limitation.

Figure 2A:
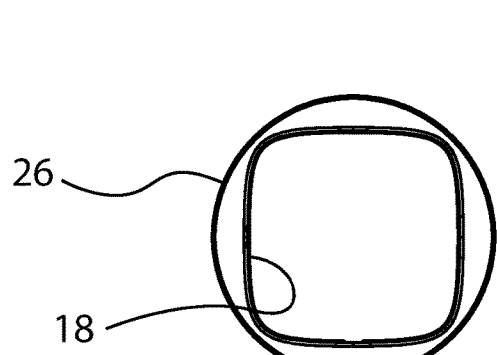
FIGS. 2A-2F illustrate details of components of the apparatus of FIG. 1.
Figure 2D:
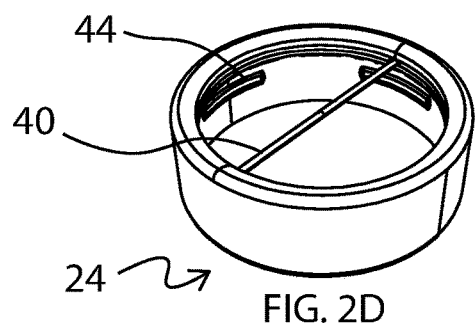
Figure 2E:
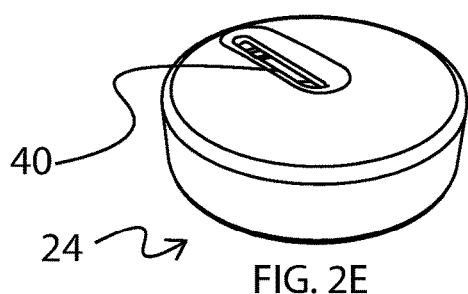
Figure 2C:
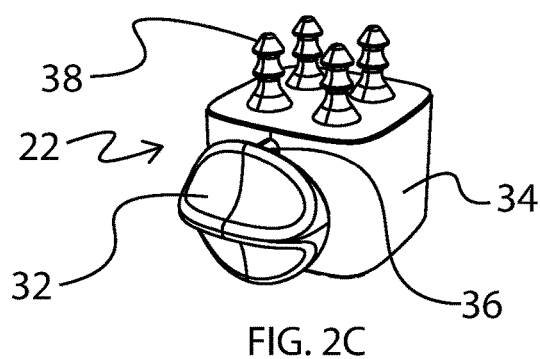
Figure 2B:
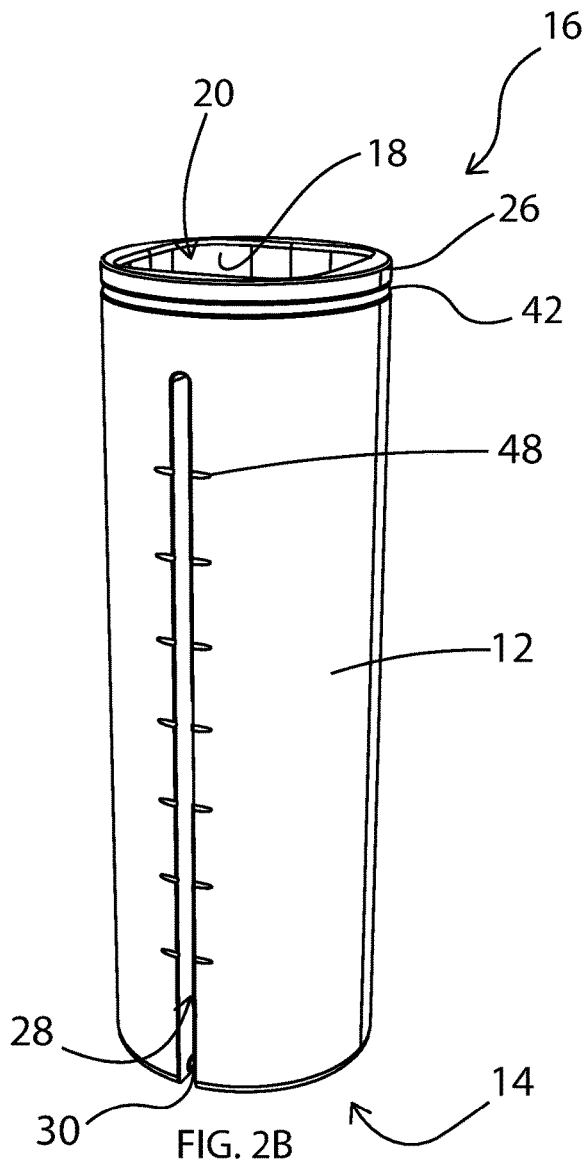

Referring additionally to FIGS. 2A and 2B, in various embodiments a shape of the outer surface 26 of the housing 12 is substantially circular and a shape of the inner surface 18 of the housing 12 is substantially square. It will be appreciated that the substantially circular (or substantially round) shape of the outer surface 26 helps allow rotational accessories (discussed below) to pivot around the housing 12. In various embodiments, the substantially square shape of the inner surface 18 of the housing 12 is a rounded square. It will be appreciated that, in such embodiments, a rounded square shape can help reduce friction with a square food product (such as sticks of food product) by creating touch points of the square food product only at the corners of the food product. It will be appreciated that this reduction in friction can help improve efficacy of the food product motivating mechanism 22.

In various embodiments, the housing 12 may be made from a co-polyester or the like to achieve uneven wall thickness of the housing 12 that enables a transition from an inner square (that is, the inner surface 18) to an outer circle (that is, the outer surface 26). However, it will be appreciated that in various embodiments the housing 12 could be injection molded out of plastic or silicone or extruded and machined out of metal, as desired for a particular application.

In various embodiments the housing 12 defines therein a longitudinal slot 28 that extends from the first end 14 toward the second end 16. In such embodiments, the slot 28 is configured to receive therein a portion (described below) of the food product motivating mechanism 22. The slot 28 traps the food product motivating mechanism 22 and allows the food product motivating mechanism 22 to move forward and backward inside of the housing 12. In various embodiments the slot 28 includes detents 30 (FIG. 2B) near an end of the slot 28 at the first end 14 to help reduce likelihood of the food product motivating mechanism 22 from easily sliding out of the housing 12.

Referring additionally to FIG. 2C, in various embodiments the food product motivating mechanism 22 includes a tab 32 configured to be engaged by a user and further configured to be slidably urgeable through the slot 28. The food product motivating mechanism 22 includes a body 34. In various embodiments the tab 32 is attached to the body 34 via a mounting member 36. The mounting member 36 is sized such that the mounting member 36 is receivable in the slot 28. In such embodiments, the tab 32 can help provide a relatively comfortable interface device for a user to push and pull the food product motivating mechanism 22 and food product within the housing 12.

In various embodiments the food product motivating mechanism 22 includes barbs 38 that are configured to engage thereon a food product. In such embodiments, the barbs 38 stick into the food product when loaded and attach the food product to the food product motivating mechanism 22.

Referring additionally to FIGS. 2D and 2E, in various embodiments the rotating cutting mechanism 24 may include various cutting devices 40. For example, in some embodiments and as shown in FIG. 2D, the cutting device 40 may include a wire. In such embodiments, the wire freely rotates to cut the food product that has been pushed therethrough. It will be appreciated that, advantageously, in such embodiments only 180 degrees of turning of the cutting device 40 (that is, the wire) is entailed to cut food product off a stick of food product. It will also be appreciated that, in such embodiments, the cutting device 40 (that is, the wire) cuts the food product into two equal parts when pushed therethrough. As such, in such embodiments the apparatus 10 can be used for ½ tablespoon measurements. It will be appreciated that the wire may have any shape as desired for a particular application. For example, in some such embodiments the wire may be a round wire. As another example and in some other such embodiments, the wire may be a triangular-shaped wire extrusion. It will be appreciated that a triangular-shaped wire extrusion can help to increase cutting efficacy while maintaining a larger wire size for durability.

In some other embodiments and as shown in FIG. 2E, the cutting device 40 may include a blade. In such embodiments, the blade and a constricted opening cooperate to produce a thin shaving of food product when the blade is rotated against the end of the food product.

In various embodiments and as shown in FIGS. 1 and 2B, the housing 12 defines a channel 42 near the second end 16. As shown in FIGS. 1 and 2D, in such embodiments mating features 44 (FIGS. 1 and 2D), such as detents, of the rotating cutting mechanism 24 are sized to engage with the channel 42. In such embodiments, the channel 42 and the mating features 44 cooperate to allow the rotating cutting mechanism 24 to snap onto the housing 12 and then freely rotate.

In various embodiments, the slot 28 terminates toward the second end 16 of the housing 12. The slot 28 terminates at a location that causes movement of the food product motivating mechanism 22 to stop before reaching the second end 16 of the housing 12. In such embodiments, the barbs 38 are prevented from pushing too far forward in the housing 12, thereby helping to avoid collisions between the barbs 38 and the cutting device 40.

Figure 2F:
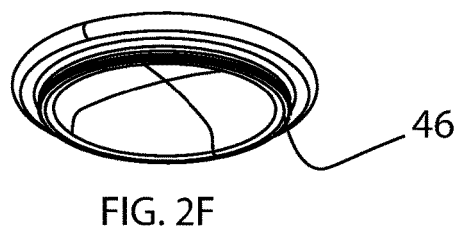

In various embodiments and referring additionally to FIG. 2F, a cap 46 is configured to be removably attachable to the rotating cutting mechanism 24. In such embodiments, the cap 46 snaps to rotating cutting mechanism 24 and seals the front of the apparatus 10, thereby helping prevent a user or other person from having unintended contact with the cutting device 40.

In various embodiments, the housing 12 may have measuring indicia 48, such as markings, which denote a specified amount of food product. As the food product motivating mechanism 22 is pushed forward, the tab 32 can be used to track the measuring indicia 48, thereby helping a user to know how much food product is being cut and/or dispensed.

Various embodiments operate as follows. A user can snap the food product motivating mechanism 22 into the first end 14 of the housing 12 and into the slot 28 with the barbs 38 facing forward (that is, toward the second end 16 of the housing 12). Food product is then loaded into the second end 16 of the housing 12 and pressed down onto the barbs 38, thereby securing the food product to the food product motivating mechanism 22. The rotating cutting mechanism 24 is snapped onto the outer surface 26 of the housing 12 at the second end 16 and can rotate freely. The cap 46 can be snapped onto the rotating cutting mechanism 24 to seal the front of the apparatus 10.

To use the apparatus 10 that is assembled and loaded with food product, a user can remove the cap 46 and push the food product motivating mechanism 22 forward to push the desired amount of food product through the cutting device 40 and expose the food product out of the front of the apparatus 10. At this point, a user can hold the apparatus 10 and spread the exposed food product directly onto any surface. The rotating cutting mechanism 24 can be rotated 180 degrees or more to cut off any food product that has been pushed through the cutting device 40 and out of the front of the apparatus 10. In this case, cutting the exposed food product is useful to discard dirty or contaminated food product from the rest of the stick of food product. If a user wants to dispense a specific or non-specific amount of food product off the stick of food product and out of the apparatus 10, a user can push the food product motivating mechanism 22 forward, thereby tracking the tab 32 against the indicia 48 until the desired amount of food product has been pushed through the cutting device 40 and exposed out of the front of the apparatus 10. The cutter is then rotated 180 degrees or more to cut the exposed amount of food product off the stick of food product and out the front of the apparatus 10.

When finished, a user can snap the cap 46 onto the rotating cutting mechanism 24 for storage. To use a different cutting or sealing accessory, a user can remove the rotating cutting mechanism 24 and snap the new accessory onto the front of the housing 12. To use the ribbon cutter (that is, the rotating cutting mechanism 24 that includes a blade as the cutting device 40), a user can snap the ribbon cutter onto the front of the housing 12 and simultaneously push the food product motivating mechanism 22 forward while rotating the ribbon cutter, thereby shaving off a contiguous, thin amount of food product. To clean the apparatus 10, a user can snap all parts apart and either hand wash or place into a dishwasher.

To avoid dirtying a cutting surface and utensils and dealing with wrappers, a user can push the food product motivating mechanism 22 forward, thereby exposing food product from the apparatus 10. A user then can either spread the exposed food product directly onto a surface or rotate the rotating cutting mechanism 24 to dispense a desired amount of food product from the apparatus 10. If the food product is to be spread, then once the food product has been spread a user can rotate the rotating cutting mechanism 24 to discard the dirty end of the food product. The food product can then be stored and a user would not have to attend to dirty utensils, cutting surfaces, or wrappers and the stored food product will be clean and may not be contaminated.

Various embodiments may be fabricated as follows. The housing 12 may be injection molded out of plastic or silicone, or extruded and machined out of metal. The rotating cutting mechanism 24 may be made out of plastic with a wire that is either insert molded or trapped between two pieces of plastic that are sonic welded or glued. The rotating cutting mechanism 24 may also be made of cast or stamped metal. Ribbon cutter versions of the rotating cutting mechanism 24 may be made out of a single piece of plastic or metal. The cap 46 may be made out of injection molded plastic. The food product motivating mechanism 22 may be made out of injection molded plastic or metal. The barbs 38 may be molded using a complex tool or as separate parts that are secured to the food product motivating mechanism 22 through sonic welding or glue.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. An apparatus comprising:
   a housing having a first end and a second end and a central longitudinal axis, an inner surface of the housing defining a channel that is configured to slidably receive therein a food product;
   a food product motivating mechanism configured to engage a food product, the food product motivating mechanism being slidably receivable in the first end of the housing, the food product motivating mechanism and the housing being configured to cooperatively slidably urge a food product from the first end of the housing toward the second end of the housing;
   a rotating cutting mechanism removably and rotatably attachable to a radially-outward-facing surface of the housing at the second end of the housing, the rotating cutting mechanism being configured to rotate around the radially-outward-facing surface of the housing about the central longitudinal axis and the outer surface of the housing at the second end of the housing, the rotating cutting mechanism having at least one transverse wire to cuttingly engage a food product; and
   the food product motivating mechanism and the rotating cutting mechanism being configured to intermittently advance the food product, and cut the food product into two or more planar-sided food products while the food product is not advancing.

2. The apparatus of claim 1, wherein a shape of the outer surface of the housing is substantially circular and a shape of the inner surface of the housing is substantially square.

3. The apparatus of claim 1, wherein the housing defines therein a longitudinal slot from the first end toward the second end, the slot being configured to receive therein a portion of the food product motivating mechanism.

4. The apparatus of claim 3, wherein the food product motivating mechanism includes a tab configured to be engaged by a user and further configured to be slidably urgeable through the slot.

5. The apparatus of claim 1, wherein the food product motivating mechanism includes a plurality of barbs configured to engage thereon a food product.

6. The apparatus of claim 1, further comprising a cap configured to be removably attachable to the rotating cutting mechanism.

7. An apparatus comprising:
   a housing having a first end and a second end and a central longitudinal axis, an inner surface of the housing defining a channel that is configured to slidably receive therein a food product;
   a food product motivating mechanism configured to engage a food product, the food product motivating mechanism being slidably receivable in the first end of the housing, the food product motivating mechanism and the housing being configured to cooperatively slidably urge a food product from the first end of the housing toward the second end of the housing;

a rotating cutting mechanism removably and rotatably attachable to a radially outward-facing channel formed in an outer surface of the housing at the second end of the housing, the rotating cutting mechanism being configured to rotate within the radially outward-facing facing channel to enable the rotating cutting mechanism to rotate around the central longitudinal axis, the rotating cutting mechanism being further configured to cuttingly engage a food product, the rotating cutting mechanism including at least one transverse wire; and the food product motivating mechanism and the rotating cutting mechanism being configured to intermittently advance the food product, and cut the food product into two or more planar-sided food products while the food product is not advancing.

8. The apparatus of claim 7, wherein a shape of the outer surface of the housing is substantially circular and a shape of the inner surface of the housing is substantially square.

9. The apparatus of claim 7, wherein the housing defines therein a longitudinal slot from the first end toward the second end, the slot being configured to receive therein a portion of the food product motivating mechanism.

10. The apparatus of claim 9, wherein the food product motivating mechanism includes a tab configured to be engaged by a user and further configured to be slidably urgeable through the slot.

11. The apparatus of claim 7, wherein the food product motivating mechanism includes a plurality of barbs configured to engage thereon a food product.

12. The apparatus of claim 7, further comprising a cap configured to be removably attachable to the rotating cutting mechanism.

* * * * *